US012792281B2

(12) United States Patent
Takao

(10) Patent No.: US 12,792,281 B2
(45) Date of Patent: Nov. 10, 2026

(54) IMAGE-FORMING APPARATUS AND METHOD TO PRINT COLOR IMAGES AND DISPLAYING PREVIEW PATTERNS CORRESPONDING TO SETTINGS

(71) Applicant: CANON KABUSHIKI KAISHA, Tokyo (JP)

(72) Inventor: Yoshifumi Takao, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 161 days.

(21) Appl. No.: 18/976,759

(22) Filed: Dec. 11, 2024

(65) Prior Publication Data

US 2025/0199733 A1 Jun. 19, 2025

(30) Foreign Application Priority Data

Dec. 19, 2023 (JP) ................................ 2023-214035

(51) Int. Cl.
*G06F 3/12* (2006.01)
*G03G 15/00* (2006.01)
*H04N 1/60* (2006.01)

(52) U.S. Cl.
CPC .......... *G06F 3/1256* (2013.01); *G06F 3/1208* (2013.01); *G06F 3/1254* (2013.01); *G03G 15/5058* (2013.01); *H04N 1/6033* (2013.01)

(58) Field of Classification Search
None
See application file for complete search history.

(56) References Cited

U.S. PATENT DOCUMENTS 12,593,000 B2 * 3/2026 Kitajima .............. H04N 1/3872
2009/0037812 A1 2/2009 Asai
2012/0050771 A1 * 3/2012 Sakatani ............ H04N 1/00015 358/1.9
2012/0075645 A1 * 3/2012 Katayama ............ H04N 1/6055 358/1.9
2019/0286396 A1 * 9/2019 Kubo .................... G06F 3/0482
2024/0289065 A1 * 8/2024 Tanaka .................. G06F 3/1234

FOREIGN PATENT DOCUMENTS

JP 2009038526 A 2/2009
JP 2012053089 A 3/2012
JP 2015198349 A 11/2015
JP 2018074517 A 5/2018
JP 2018151586 A 9/2018

* cited by examiner

*Primary Examiner* — Haris Sabah
(74) *Attorney, Agent, or Firm* — ROSSI, KIMMS & McDOWELL LLP

(57) ABSTRACT

An image-forming apparatus includes: an image-forming unit configured to form a user image on a sheet based on printing-related settings; and a control unit configured to cause a display unit to display a preview image related to the user image formed by the image-forming unit. The control unit is configured to control the display unit to display two or more preview images corresponding to different printing-related settings without requiring a user to change settings. The printing-related settings include a setting related to whether to print a pattern different from the user image on the sheet. The two or more preview images include a first preview image on which a display object representing the pattern is superimposed, and a second preview image on which the display object representing the pattern is not superimposed.

13 Claims, 13 Drawing Sheets

IMAGE-FORMING APPARATUS AND METHOD TO PRINT COLOR IMAGES AND DISPLAYING PREVIEW PATTERNS CORRESPONDING TO SETTINGS

BACKGROUND OF THE INVENTION

Field of the Invention

The present disclosure relates to an image-forming apparatus and method.

Description of the Related Art

Conventionally, a technique is known that presents a preview image to a user when the user has made a printing request to a printing apparatus. For example, Japanese Patent Laid-Open No. 2009-38526 discloses a printing server apparatus that can generate a preview image similar to a final image of a printout of a remote printing service in accordance with print settings.

Furthermore, a technique is also known that uses a reader to read a sheet on which an image has been formed by an image-forming apparatus, and automatically adjusts image-forming conditions based on the read image. For example, Japanese Patent Laid-Open No. 2012-53089 discloses a technique to use a gamma curve, which is generated based on the result of reading of a tone pattern formed on a sheet using an optical sensor, in the adjustment of density output conditions of an image-forming apparatus for each of a plurality of color components that compose a color image. Patent Document 2 presents an example in which a tone pattern is formed in a peripheral region of a sheet that is expected to be separated by way of trimming.

SUMMARY OF THE INVENTION

However, with a preview function of the printing server apparatus disclosed in Japanese Patent Laid-Open No. 2009-38526, it is not possible to easily determine how a user should change the settings to achieve a desired printing result. For example, taking the example of automatic adjustment of image-forming conditions described in Japanese Patent Laid-Open No. 2012-53089, some users may arrange content also in a peripheral region of a sheet. A user may arrange a code used for job management or content management (e.g., a serial number, a one-dimensional barcode, or a two-dimensional barcode), a unique color patch, or the like in a peripheral region of an input image. When the setting of automatic adjustment of image-forming conditions is enabled and a user's content is arranged at a position where a pattern for adjustment of the image-forming conditions (hereinafter referred to as a pattern for adjustment) is formed, the pattern for adjustment and the user's content image overlap each other. Although the user can make an attempt to check whether the pattern for adjustment overlaps the content image while looking at a preview image, there are cases where it is difficult for the user to appropriately determine whether there is an overlap on a simple printing preview.

In view of the foregoing issues, the present invention aims to provide a preview function that allows a user to more easily determine the influence of printing-related settings on a printing result.

According to one aspect, there is provided an image-forming apparatus, including: an image-forming unit configured to form a user image on a sheet based on printing-related settings; and a control unit configured to cause a display unit to display a preview image related to the user image formed by the image-forming unit. The control unit is configured to control the display unit to display two or more preview images corresponding to different printing-related settings without requiring a user to change settings. The printing-related settings include a setting related to whether to print a pattern different from the user image on the sheet. The two or more preview images include a first preview image on which a display object representing the pattern is superimposed, and a second preview image on which the display object representing the pattern is not superimposed. A corresponding method is also provided.

Further features of the present invention will become apparent from the following description of exemplary embodiments (with reference to the attached drawings).

DESCRIPTION OF THE EMBODIMENTS

Figure 1:
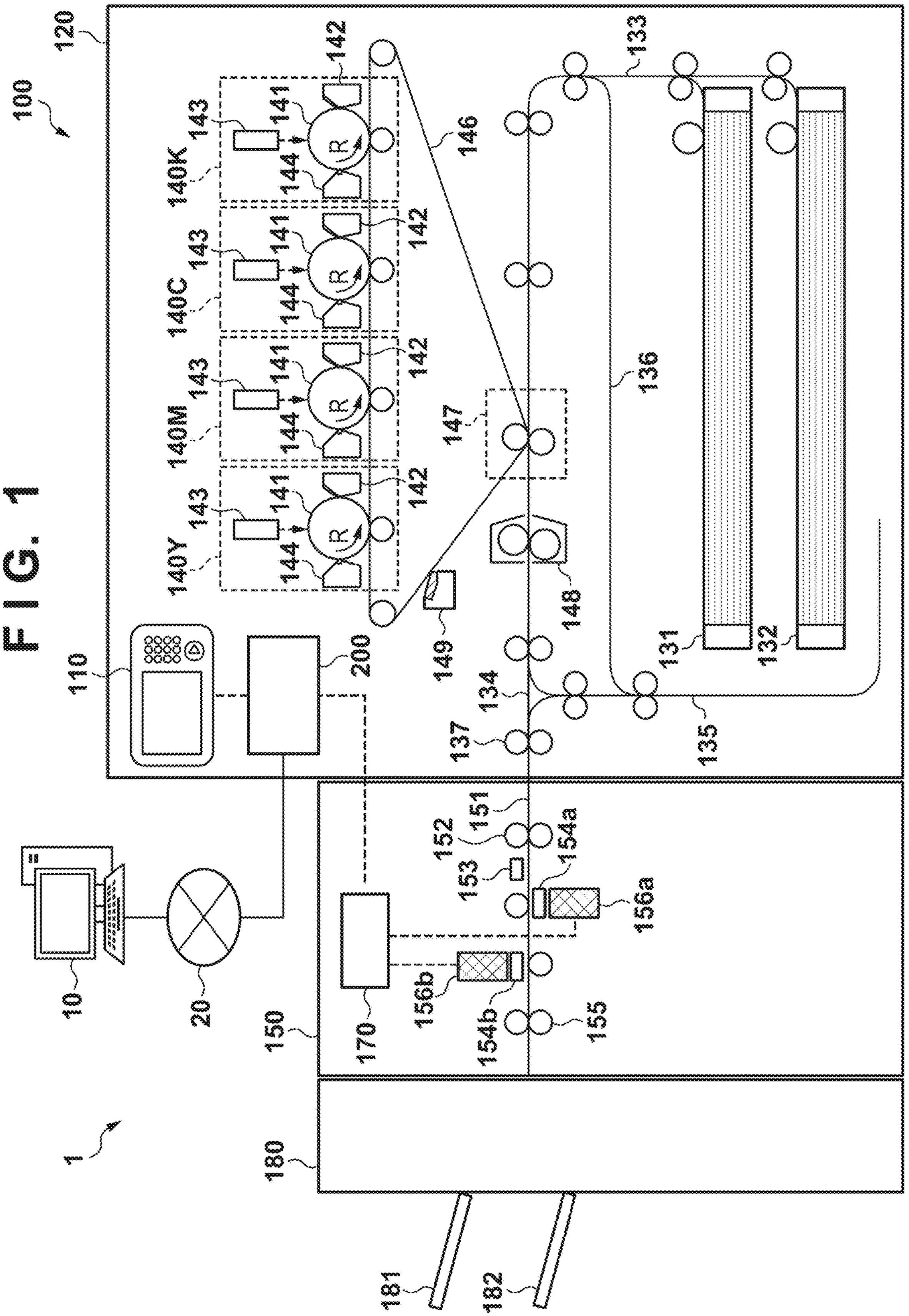
FIG. 1 is a schematic diagram showing an example of a configuration of a printing system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Overview of System

FIG. 1 is a schematic diagram showing a configuration of a printing system 1 according to an embodiment. Referring to FIG. 1, the printing system 1 includes a host computer 10 and an image-forming apparatus 100. The host computer 10 is connected to the image-forming apparatus 100 via a network 20. The network 20 may be a wired communication network, or may be a wireless communication network. For example, the network 20 may include one or more of a local area network (LAN), a wide area network (WAN), and a public communication line. Although FIG. 1 shows one host computer 10 and one image-forming apparatus 100, the printing system 1 may include a larger number of host computers and image-forming apparatuses.

The host computer 10 is an apparatus that issues a print job to be executed by the image-forming apparatus 100. As one example, the host computer 10 may be a terminal apparatus, such as a personal computer (PC) and a smartphone, provided with a user interface that includes a display. As another example, the host computer 10 may be a server apparatus that accepts a printing request from another terminal apparatus (not shown) and issues a print job. Typically, a print job includes input image data that represents a user image to be printed, and additionally includes such job parameters as the number of copies to be printed, a designated sheet type, and double-sided/single-sided.

The image-forming apparatus 100 is an apparatus that forms an image on a sheet by executing a print job. In the present embodiment, it is assumed that the image-forming apparatus 100 is a color laser printer capable of printing a color image using an electrophotographic method. In another embodiment, the image-forming apparatus 100 may be any other type of image-forming apparatus, such as a monochrome laser printer or an inkjet printer.

2. Configuration of Image-Forming Apparatus

As shown in FIG. 1, the image-forming apparatus 100 includes an operation panel 110, a printer unit 120, a reader unit 150, a finisher 180, and a controller 200.

2-1. Operation Panel

The operation panel 110 is a unit that provides user interfaces (UIs) including an input interface and an output interface. The input interface can include one or more of buttons, numeric keys, a touch panel, switches, and a microphone, for example. The output interface can include one or more of a display, a speaker, and a lamp, for example. The operation panel 110 accepts a user input via the input interface, and outputs the accepted user input to the controller 200. Furthermore, the operation panel 110 outputs information generated by the controller 200 via the output interface (e.g., causes the display to display an image, or causes the speaker to output sounds). A user can instruct the image-forming apparatus 100 to execute a job and change job-related settings by operating the operation panel 110, for example.

2-2. Printer Unit

The printer unit 120 is an image-forming unit that forms an image on a sheet based on at least one image-forming condition. In the example of FIG. 1, the printer unit 120 includes paper feeding trays 131 and 132, image-forming units 140Y, 140M, 140C, and 140K, an intermediate transfer member 146, a transfer unit 147, a fixing device 148, and a cleaner 149.

Each of the paper feeding trays 131 and 132 stores a stack of sheets. The paper feeding trays 131 and 132 may store the same type of sheets, or may store different types of sheets. Although FIG. 1 shows two paper feeding trays 131 and 132, the number of paper feeding trays included in the image-forming apparatus 100 is not limited to two. When a print job is executed, sheets are picked up, one by one, by a feeding mechanism from the paper feeding tray 131 or 132 (e.g., the paper feeding tray designated by a job parameter), and conveyed along a conveyance path 133.

The image-forming unit 140Y forms a yellow (Y) toner image on the intermediate transfer member 146. The image-forming unit 140M forms a magenta (M) toner image on the intermediate transfer member 146. The image-forming unit 140C forms a cyan (C) toner image on the intermediate transfer member 146. The image-forming unit 140K forms a black (K) toner image on the intermediate transfer member 146. As the image-forming units 140Y, 140M, 140C, and 140K are configured in the same way as one another, the following description will be provided using the configuration of the image-forming unit 140Y as an example. The image-forming unit 140Y includes a photosensitive drum 141, a charging device 142, an exposure device 143, and a developing device 144. The photosensitive drum 141 is a drum-shaped photosensitive member that includes a photosensitive layer on a surface thereof. The photosensitive drum 141 rotates about a drum axis in the direction of arrow R in the figure. The charging device 142 uniformly charges the surface of the rotating photosensitive drum 141. The exposure device 143 irradiates the photosensitive drum 141 with laser light in accordance with image data (that represents a yellow image in the present case) input from the controller 200. The laser light output from the exposure device 143 scans the surface of the charged photosensitive drum 141 in the direction of the drum axis, thereby forming an electrostatic latent image on the surface of the photosensitive drum 141. In the following description, the direction of scanning with the laser light (the depth direction in FIG. 1) is also referred to as a main-scanning direction, and the direction that is perpendicular to the main-scanning direction on the surface of the drum or sheet is also referred to as a sub-scanning direction. The developing device 144 develops the electrostatic latent image on the photosensitive drum 141 by supplying toner (in yellow in the present case) to the surface of the photosensitive drum 141. As a result, a toner image is formed on the surface of the photosensitive drum 141. The yellow toner image that has been formed on the surface of the photosensitive drum 141 in the image-forming unit 140Y is transferred to the intermediate transfer member 146. Furthermore, magenta, cyan, and black toner images that have been respectively formed on the surfaces of the photosensitive drums 141 in the image-forming units 140M, 140C, and 140K are sequentially transferred to the intermediate transfer member 146 in such a manner that they are superimposed over the yellow toner image. As a result, a full-color toner image is formed on the intermediate transfer member 146. The intermediate transfer member 146 is an endless belt member, and rotates in the clockwise direction in the figure. The intermediate transfer member 146 conveys the full-color toner image to the position of the transfer unit 147 (transfer nip).

Under control of the controller 200, the sheet that has been picked up from the paper feeding tray 131 or 132 is conveyed to the transfer nip in harmony with the timing of arrival of the toner image on the intermediate transfer member 146 at the transfer nip. The transfer unit 147 transfers the toner image carried by the intermediate transfer member 146 to the sheet at the transfer nip. The fixing device 148 includes a heater and a pressurizing roller. The fixing device 148 heats the toner image transferred to the sheet using the heater, and pressurizes the same using the pressurizing roller. As a result, the toner on the sheet is fused, and the toner image is fixed to the sheet. Although FIG. 1 shows an example in which the image-forming apparatus 100 includes one fixing device 148, the image-forming apparatus 100 may further include a second fixing device that is used to, for example, increase glossiness or improve the fixing performance. The cleaner 149 is arranged downstream relative to the transfer nip along the trajectory of the intermediate transfer member 146, and removes toner remaining on the intermediate transfer member 146 after the transfer of the toner image.

The conveyance path 133 bifurcates into conveyance paths 134 and 135 in a section that is downstream relative to the fixing device 148. The sheet that has passed through the fixing device 148 is conveyed from the conveyance path 133 to the conveyance path 135. When a trailing end of the sheet has entered the conveyance path 135, the conveyance direction is reversed, and the sheet is discharged from a discharge roller 137 to the reader unit 150. Through this conveyance, the sheet is discharged in a state where the surface thereof on which the image has been formed is facing downward (called face-down). Note that in a case where double-sided printing is performed, the sheet that has entered the conveyance path 135 is conveyed to a conveyance path 136, returns to the conveyance path 133 from the conveyance path 136, and passes through the transfer nip again in a state where the front and back thereof have been inverted. The transfer unit 147 forms a toner image on the back surface of the sheet at the transfer nip, and the fixing device 148 fixes the toner image on the sheet. Once the images have been formed on both surfaces of the sheet, the sheet is discharged from the discharge roller 137 to the reader unit 150.

In the present embodiment, the image-forming apparatus 100 accepts various printing-related settings that can influence the result of printing operations in the printer unit 120. The printing-related settings include, for example, a setting related to whether to print a pattern different from a user image on a sheet. An example of a pattern that can be formed by the printer unit 120 on a sheet in accordance with the printing-related settings is a pattern for adjustment used in the adjustment of at least one image-forming condition. Specifically, in the present embodiment, the image-forming apparatus 100 has a function of automatically adjusting image-forming conditions on the printer unit 120. For the automatic adjustment of the image-forming conditions, the printer unit 120 is capable of forming one or more patterns for adjustment, together with a user image (or separately from the user image), on the sheet. As a first example, the image-forming conditions include a condition related to the density of an image formed by the printer unit 120. In this case, the patterns for adjustment include one or more tone patterns (first patterns) used in automatic adjustment of the density. As a second example, the image-forming conditions include a condition related to the position at which the user image is formed by the printer unit 120. In this case, the patterns for adjustment include one or more position determination marks (second patterns) used in measurement of displacement of an image-forming position at which the user image is formed on the sheet. The automatic adjustment of the image-forming conditions that uses such patterns for adjustment will be described below in detail. In addition, several examples of patterns other than these patterns for adjustment will also be further described below.

2-3. Reader Unit

The reader unit 150 is a reading unit that generates a read image by optically reading a sheet. In the example of FIG. 1, the reader unit 150 includes a conveyance path 151, conveyance rollers 152, a document sensor 153, a feed-scanning glass 154*a*, a feed-scanning glass 154*b*, a conveyance roller 155, a first line sensor 156*a*, a second line sensor 156*b*, and a detection circuit 170. The conveyance rollers 152 receive a sheet discharged from the image-forming apparatus 100, and conveys the sheet along the conveyance path 151. The document sensor 153 may be, for example, a photointerrupter that includes a light-emitting element and a light-receiving element, and detects a leading end of the sheet that has passed through the conveyance rollers 152. The first line sensor 156*a* generates read image data by optically reading the lower surface of the sheet that passes over the feed-scanning glass 154*a*, and outputs the generated read image data to the detection circuit 170. The second line sensor 156*b* generates read image data by optically reading the upper surface of the sheet that passes underneath the feed-scanning glass 154*b*, and outputs the generated read image data to the detection circuit 170. The first line sensor 156*a* and the second line sensor 156*b* may be, for example, contact image sensors (CISs). The timings at which the first line sensor 156*a* and the second line sensor 156*b* read the sheet can be controlled by the controller 200 based on the timing of detection of the leading end of the sheet by the document sensor 153. Note that in the following description, when it is not necessary to distinguish the first line sensor 156*a* and the second line sensor 156*b* from each other, they will be collectively referred to as line sensors 156 by omitting the alphabets at the end of the reference signs. The conveyance roller 155 discharges the sheet that has passed the feed-scanning glass 154*b* to the finisher 180.

Figure 2:
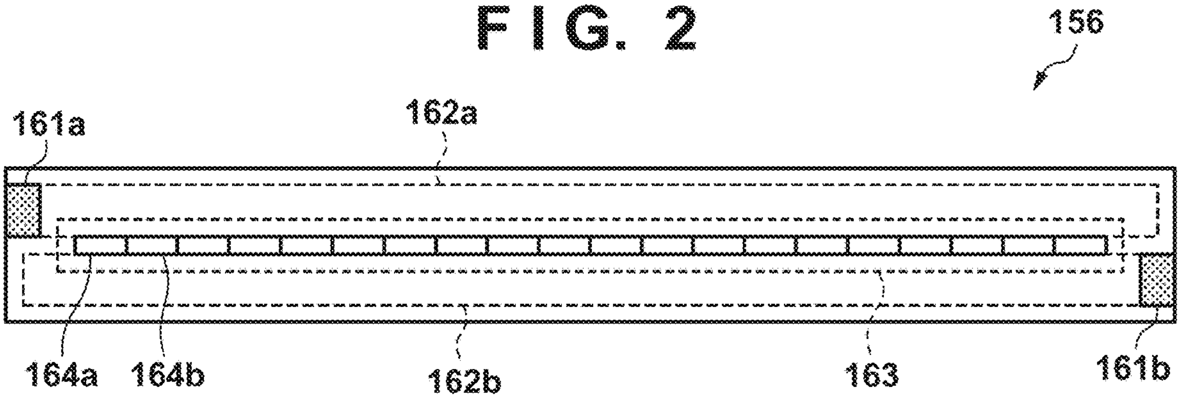
FIG. 2 is a schematic diagram showing an example of a configuration of a line sensor according to an embodiment.

FIG. 2 is a schematic diagram showing an example of a configuration of the line sensors 156. Referring to FIG. 2, the line sensors 156 include light sources 161*a* and 161*b*, light-guiding members 162*a* and 162*b*, a lens array 163, and a plurality of sensor chips 164*a*, 164*b*, . . . (also referred to as a sensor chip group 164). Each of the light sources 161*a* and 161*b* may be, for example, a light-emitting diode (LED) that emits while light. The light-guiding member 162*a* directs light emitted from the light source 161*a* toward a sheet while diffusing the light. The light-guiding member 162*b* directs light emitted from the light source 161*b* toward the sheet. The light-guiding members 162*a* and 162*b* include linear optical paths parallel to the main-scanning direction of the sheet; accordingly, the entirety of each line parallel to the main-scanning direction of the sheet being conveyed is irradiated with white light. The lens array 163 is an optical system that forms an image of white light reflected off the surface of the sheet on a light-receiving surface of the sensor chip group 164. The sensor chip group 164 is a collection of optical sensor chips that are arranged in a row along the main-scanning direction of the sheet. In the present embodiment, the sensor chip group 164 is composed of three rows of color filters corresponding to three color components, namely red (R), green (G), and blue (B), and three rows of photoelectric converters corresponding thereto. Each photoelectric converter receives color component light that has passed through the corresponding color filter, and generates a corresponding electrical signal. As a result, while the sheet is passing through a reading position, the line sensors 156 output an analog image signal representing an RGB image of each line composing a read image of the sheet.

The detection circuit 170 is a detection unit that, in a case where image-forming conditions of the printer unit 120 are automatically adjusted, detects each of one or more patterns for adjustment used in the automatic adjustment by searching a read image for the same. Typically, the search for each pattern for adjustment is made within a known, limited search range that is expected to include this pattern for adjustment; this is intended to shorten a processing time period. The detection circuit 170 outputs the detection result pertaining to each pattern for adjustment to the controller 200. For example, in a case where the density (density output characteristic) is automatically adjusted, the detection result can indicate density-related information pertaining to each pattern for adjustment that has been detected (e.g., average values of luminances or densities in respective patches). In a case where the image-forming position is automatically adjusted, the detection result can indicate measured position information pertaining to each of the detected patterns for adjustment (e.g., absolute position coordinates, or a relative displacement from a reference position). An example of a detailed configuration of the detection circuit 170 will be further described below.

2-4. Finisher

The finisher 180 is a post-processing unit that executes post-processing with respect to a sheet on which an image has been formed. In the present embodiment, the finisher 180 receives a sheet discharged from the reader unit 150, conveys the sheet along an internal conveyance path, and discharges the sheet to one of discharge trays 181 and 182 (e.g., the discharge tray designated by a job parameter). The post-processing executed by the finisher 180 may include one or more of grouping, trimming, stapling, sorting, and bookbinding. For example, in a case where the finisher 180 includes a trimming mechanism (not shown), the trimming mechanism cuts off a peripheral region of the sheet by trimming the sheet in accordance with a designated size. A segment of the sheet that has been cut off can be discarded into a purge tray (not shown) inside the finisher 180.

2-5. Controller

The controller 200 controls all of the above-described operations of the image-forming apparatus 100. For example, in a case where the user has issued an instruction for executing a print job, the controller 200 controls the image-forming apparatus 100 to form a user image on a sheet based on input image data. Also, in the present embodiment, when executing a job in which automatic adjustment of image-forming conditions is enabled, the controller 200 controls the printer unit 120 to form patterns for adjustment on a sheet. Automatic adjustment of image-forming conditions may be performed, for example, in a case where the user has issued an instruction therefor, or upon arrival of an execution timing in a case where the automatic adjustment has been set to be performed regularly. A more detailed configuration related to the automatic adjustment of the image-forming conditions will be further described in the next section.

3. Automatic Adjustment of Image-Forming Conditions

Figure 3:
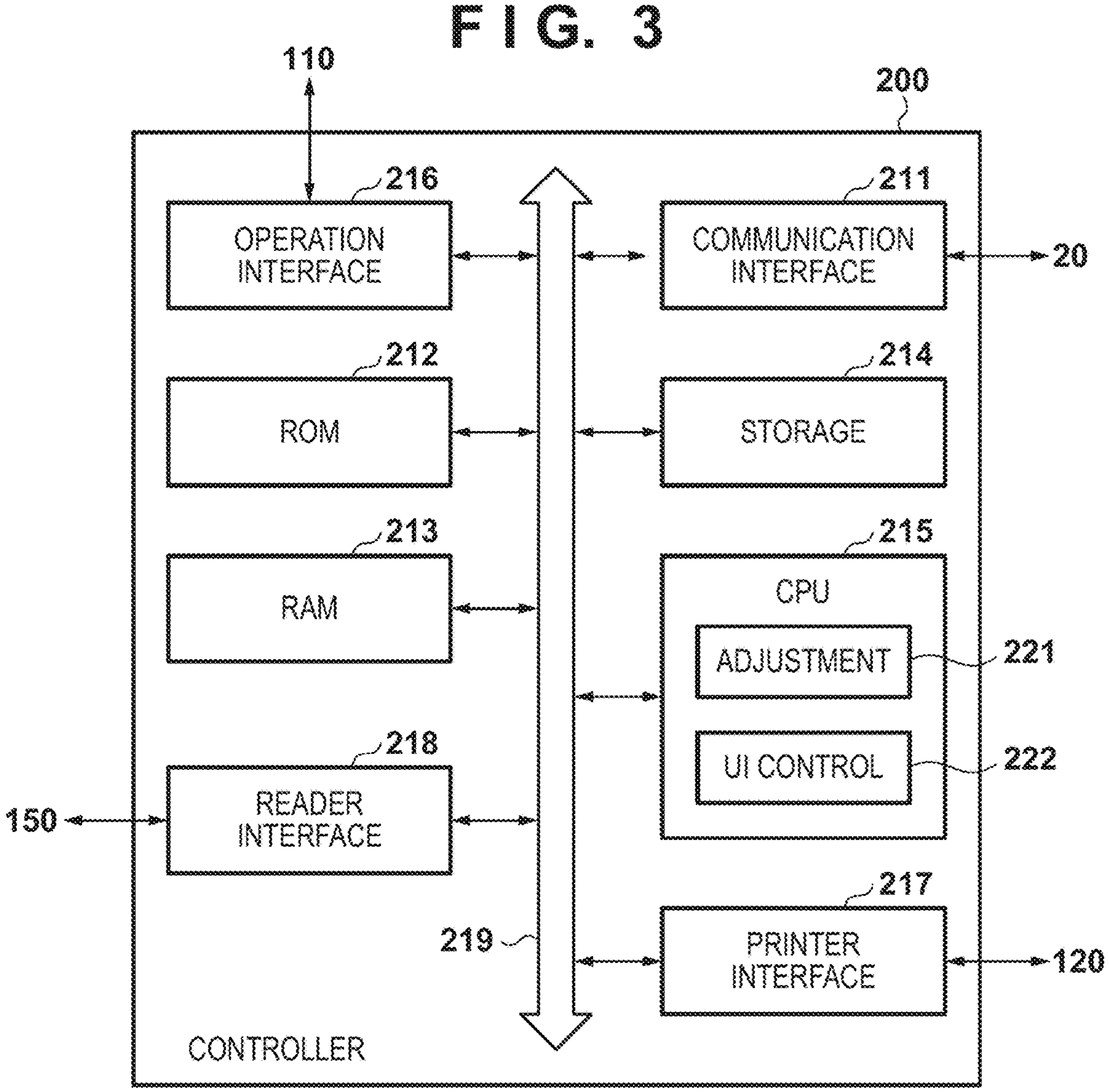
FIG. 3 is a block diagram showing an example of a more detailed configuration of a controller related to automatic adjustment of image-forming conditions.
Figure 4:
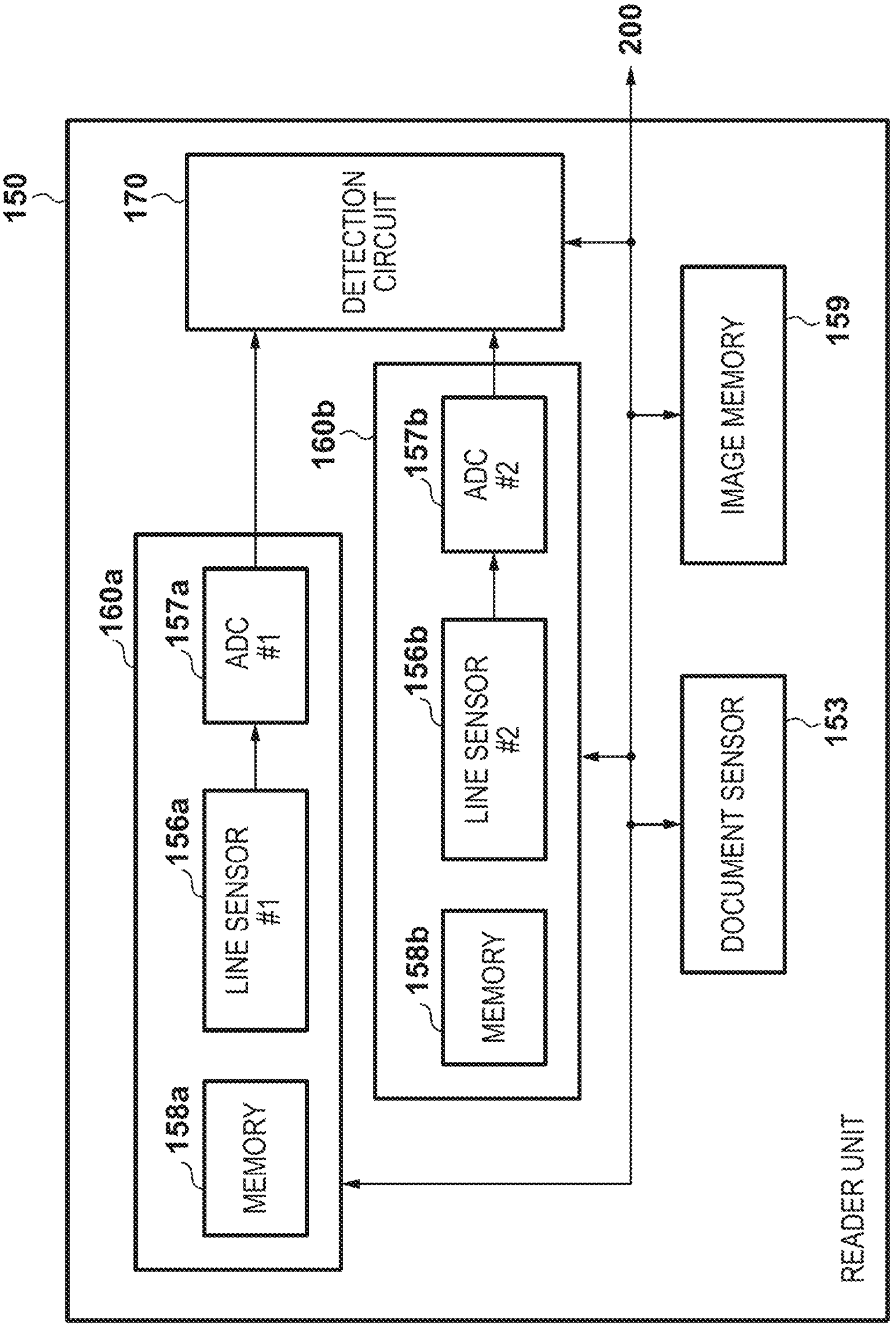
FIG. 4 is a block diagram showing an example of a more detailed configuration of a reader unit related to automatic adjustment of image-forming conditions.

FIG. 3 is a block diagram showing an example of a more detailed configuration of the controller 200 related to automatic adjustment of image-forming conditions. FIG. 4 is a block diagram showing an example of a more detailed configuration of the reader unit 150 related to automatic adjustment of image-forming conditions.

3-1. Detailed Configuration of Controller

Referring to FIG. 3, the controller 200 includes a communication interface 211, a ROM 212, a RAM 213, a storage 214, a CPU 215, an operation interface 216, a printer interface 217, and a reader interface 218. These constituent elements are mutually connected via a system bus 219.

The communication interface 211 is a communication unit that is intended for the image-forming apparatus 100 to communicate with the host computer 10 and other apparatuses via the network 20. The read-only memory (ROM) 212 is a nonvolatile memory and stores, for example, one or more computer programs for the operations of the image-forming apparatus 100. The random-access memory (RAM) 213 is a volatile memory, and provides the CPU 215 with a temporary storage area for computation. The storage 214 is a large-capacity storage device, such as a hard disk drive (HDD), a solid-state drive (SSD), and the like. The storage 214 stores computer programs and various types of data, such as setting data and image data. The central processing unit (CPU) 215 is a processing circuit that realizes various control functions of the image-forming apparatus 100 by executing the computer programs stored in the ROM 212 or the storage 214. In the present embodiment, the CPU 215 functions as an adjustment unit 221 and a UI control unit 222. The adjustment unit 221 adjusts at least one image-forming condition of the printer unit 120 based on the detection results pertaining to patterns for adjustment in a read image generated by the reader unit 150. The UI control unit 222 causes a display unit to display preview images related to a user image formed by the printer unit 120. The display unit mentioned here may be, for example, the display of the operation panel 110 in the image-forming apparatus 100 or the host computer 10. The functions of the adjustment unit 221 and the UI control unit 222 will be described below in detail. The operation interface 216 is an interface for inputting/outputting signals to/from the controller 200 and the operation panel 110. The printer interface 217 is an interface for inputting/outputting data and signals to/from the controller 200 and the printer unit 120. The reader interface 218 is an interface for inputting/outputting data and signals to/from the controller 200 and the reader unit 150.

3-2. Detailed Configuration of Reader Unit

Referring to FIG. 4, the reader unit 150 includes a document sensor 153, an image memory 159, a first line sensor unit **160*a*, a second line sensor unit 160*b*, and a detection circuit 170. The first line sensor unit 160*a* includes a first line sensor 156*a*, a first analog-digital converter (ADC) 157*a*, and a memory 158*a*. The second line sensor unit 160*b* includes a second line sensor 156*b*, a second ADC 157*b*, and a memory 158*b***.

The first ADC **157*a* converts the analog image signal (representing the read image of the first surface of the sheet) input from the first line sensor 156*a* into read image data in a digital format, and outputs the converted read image data to the detection circuit 170. The memory 168***a* stores correction values used to equalize the light amounts for the respective elements of the first line sensor 156*a* (e.g., values corresponding to variations in the light amount). The second ADC 157*b* converts the analog image signal (representing the read image of the second surface of the sheet) input from the second line sensor 156*b* into read image data in a digital format, and outputs the converted read image data to the detection circuit 170. The memory 168*b* stores correction values used to equalize the light amounts for the respective elements of the second line sensor 156*b*. The image memory 159 stores read image data generated or processed by the reader unit 150. The detection circuit 170 is a detection unit that detects one or more patterns for adjustment within a read image in a case where image-forming conditions of the printer unit 120 are automatically adjusted. The detection circuit 170 may be implemented as a dedicated processing circuit, such as a field-programmable gate array (FPGA), an application-specific integrated circuit (ASIC), and the like, or may be implemented by a combination of a general-purpose processor and software.

3-3. Automatic Adjustment Function

Figure 5A:
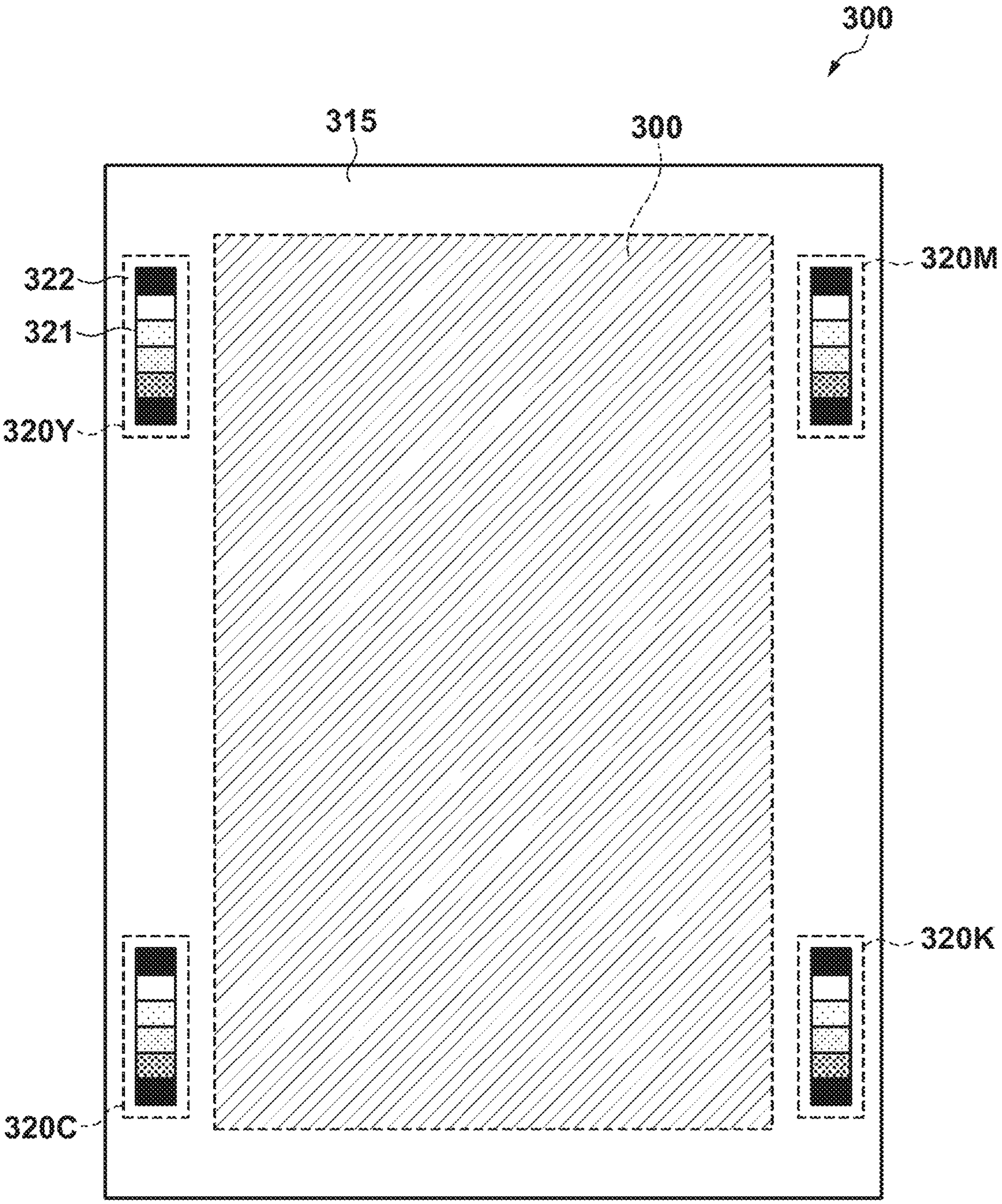
FIG. 5A is an explanatory diagram showing a first example of patterns for adjustment formed on a sheet.

The adjustment unit 221 of the controller 200 controls the printer unit 120 to form one or more patterns for adjustment on a sheet for automatic adjustment of image-forming conditions on the printer unit 120. A first example of the patterns for adjustment is tone patterns used in automatic adjustment of density. FIG. 5A shows a state where the tone patterns, which serve as the first example, are formed on a sheet 300.

Referring to FIG. 5A, the sheet 300 includes a main printing region 310 and a peripheral region 315. The peripheral region 315 is a region that surrounds the outer sides of the main printing region 310. While content of the user to be printed is arranged mainly in the main printing region 310, some sort of contents can be arranged also in the peripheral region 315. Four tone patterns 320Y, 320M, 320C, and 320K are formed in the peripheral region 315. The tone patterns 320Y, 320M, 320C, and 320K are respectively used to adjust the density output characteristics of yellow (Y), magenta (M), cyan (C), and black (K). Each tone pattern 320 is composed of a patch region 321 and a mask region 322 that surrounds the patch region 321. The patch region 321 is a non-blank region including a plurality of patch images of a corresponding color component, and these patch images can have different tone values. The mask region 322 is a blank region that has the same color as a background color (e.g., white).

The detection circuit 170 of the reader unit 150 detects each tone pattern 320 based on read image data, extracts the patch regions 321 inside the detected tone patterns 320, and calculates an average pixel value (RGB value) for each patch image. Then, the detection circuit 170 outputs average pixel values of respective tones of each color component to the controller 200.

Figure 6:
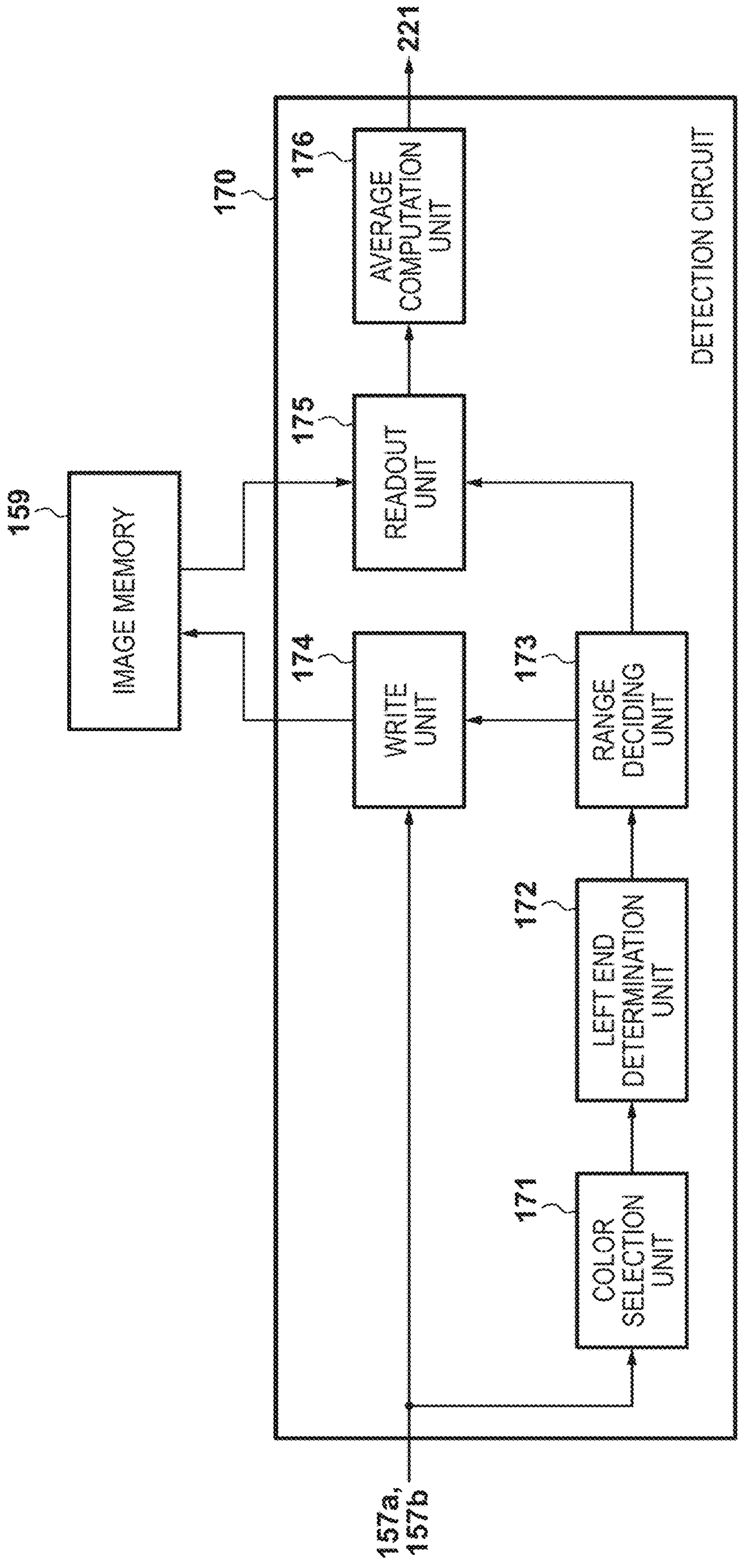
FIG. 6 is a block diagram showing an example of a detailed configuration of a detection circuit.

FIG. 6 is a block diagram showing an example of a detailed configuration of the detection circuit 170 according to the first example. Referring to FIG. 6, the detection circuit 170 includes a color selection unit 171, a left end determination unit 172, a range deciding unit 173, a write unit 174, a readout unit 175, and an average computation unit 176.

The color selection unit 171 selects any one of RGB color component images that compose read image data. In order to detect the tone patterns 320 with favorable accuracy, this selection of a color component may be made in accordance with the background color of the sheet (e.g., a color component that exhibits the largest color difference from the background color can be selected).

The left end determination unit 172 determines the position of the left end of the patch region 321 in each tone pattern 320 to be detected within the read image of the color component selected by the color selection unit 171. Here, "left" corresponds to the upstream side in a pixel array along a line in the main-scanning direction. For example, the left end determination unit 172 may determine the left end of the patch region 321 by sequentially scanning the pixel values of each line in the read image and comparing each pixel value with a pre-defined threshold. In a case where the background color of the sheet is white, the patch region 321 can be detected in a case where a pixel value (or luminance value) falls below the threshold. Note that in order to improve the determination accuracy, the left end determination unit 172 may scan the pixel values of a plurality of lines simultaneously, and determine the position of the left end of the patch region 321 using the plurality of pixel values.

The range deciding unit 173 decides on a range of each patch image to be cut out from the read image (hereinafter referred to as a cutout range) based on the result of determination made by the left end determination unit 172. For example, assume that the result of determination made by the left end determination unit 172 indicates the position coordinates of the upper-left corner of the patch region 321 in the tone pattern 320Y that has been described using FIG. 5A. The range deciding unit 173 already knows the sizes of the patch region 321 in the main-scanning direction and the sub-scanning direction. Therefore, the range deciding unit 173 can decide on a cutout range of a patch image of each tone in the tone pattern 320Y based on the position coordinates of the upper-left corner and on the known sizes. The cutout range that is decided on here may be, for example, a somewhat small range obtained by excluding the vicinities of four edges of each patch image composing the patch region 321.

The write unit 174 cuts out a patch image inside each range that has been decided on by the range deciding unit 173 from the read image (RGB image), and writes patch image data representing the patch image that has been cut out to the image memory 159. The readout unit 175 reads out the patch image data that has been written to the image memory 159, and outputs the patch image data to the average computation unit 176.

With respect to the four color components, namely Y, M, C, and K, the average computation unit 176 calculates average pixel values (RGB values) of respective tones of patch images (that have been cut out from the read image) based on each piece of patch image data input from the readout unit 175. Then, the average computation unit 176 outputs the calculated average pixel values to the adjustment unit 221 of the controller 200.

The adjustment unit 221 adjusts the density output characteristics of the image-forming units 140Y, 140M, 140C, and 140K based on the average pixel values input from the detection circuit 170. This adjustment can be made using, for example, some sort of conversion formula or lookup table that accepts a set of average pixel values as an input and outputs a parameter that specifies the density output characteristics after adjustment. As an example, in a case where the result of detection of the tone pattern 320Y indicates that the printing density is too low in the intermediate tone range of the Y component, the adjustment unit 221 may increase the density output of the intermediate tone range of the image-forming unit 140Y. As another example, in a case where the result of detection of the tone pattern 320M indicates that the printing density is too high in the low tone range of the M component, the adjustment unit 221 may reduce the density output of the low tone range of the image-forming unit 140M.

Figure 5B:
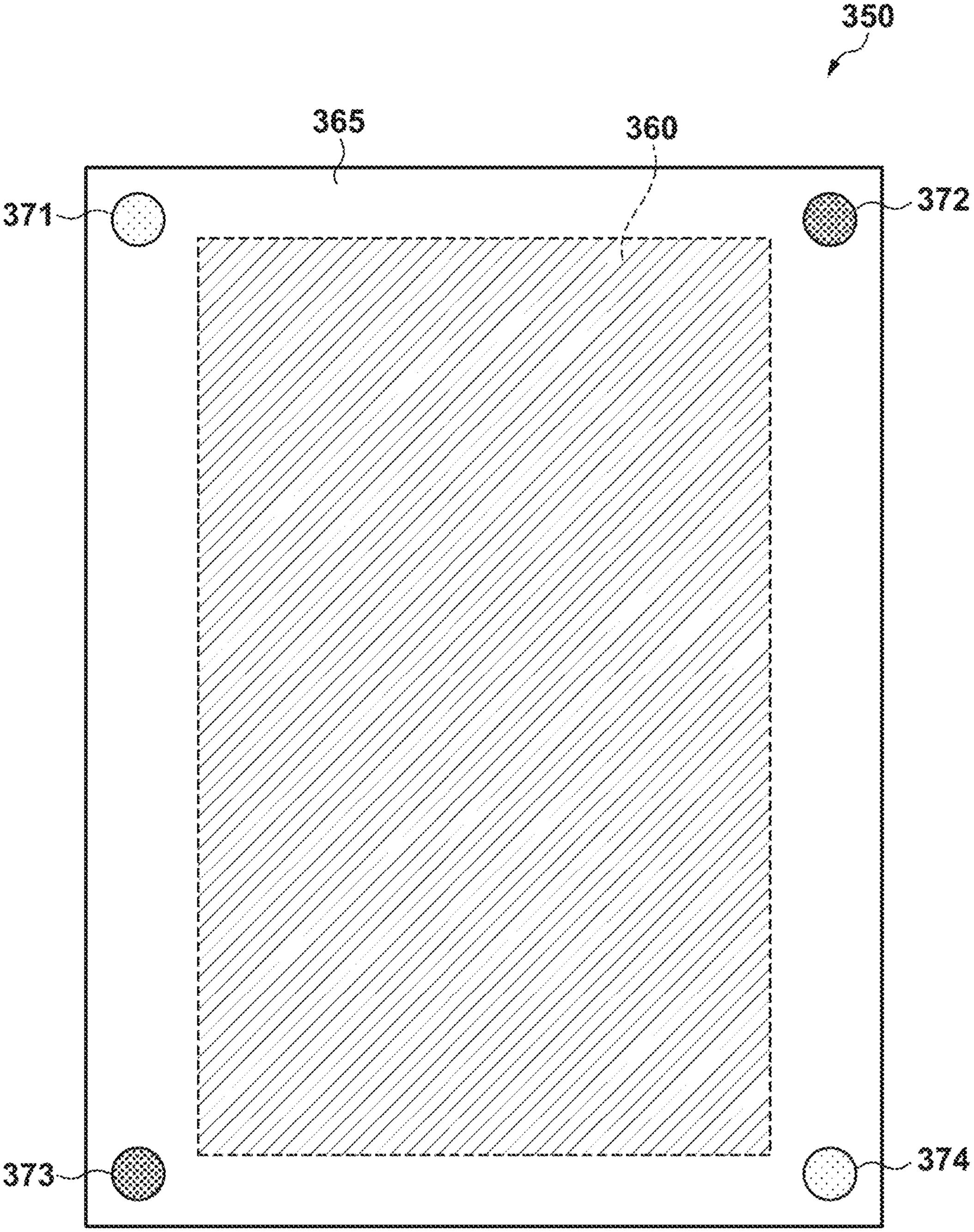
FIG. 5B is an explanatory diagram showing a second example of patterns for adjustment formed on a sheet.

A second example of the patterns for adjustment is position determination marks used for measurement of a displacement (shift) in an image-forming position at which a user image is formed on a sheet. FIG. 5B shows a state where the position determination marks, which serve as the second example, are formed on a sheet 350.

Referring to FIG. 5B, the sheet 350 includes a main printing region 360 and a peripheral region 365. Four position determination marks 371, 372, 373, and 374 are formed in the peripheral region 365. The position determination marks 371, 372, 373, and 374 are used to determine the displacement in the image-forming position in the main-scanning direction and the sub-scanning direction. Each mark may have any shape; although it has a circular shape in the example of FIG. 5B, it may be a trim mark in another example.

The detection circuit 170 of the reader unit 150 detects each of the position determination marks 371, 372, 373, and 374 by scanning read image data, and measures the position coordinates (e.g., the coordinates of the position of the mass center) of each of the detected marks. Then, the detection circuit 170 outputs the measured position coordinates to the controller 200. Based on the position coordinates input from the detection circuit 170, the adjustment unit 221 of the controller 200 adjusts the position on the sheet at which the image-forming units 140Y, 140M, 140C, and 140K form images. This adjustment may include not only translation in the main-scanning direction and the sub-scanning direction, but also enlargement or reduction in size. Also, the adjustment of the image-forming position may be performed for each color component.

Note that the tone patterns shown in FIG. 5A and the position determination marks shown in FIG. 5B may be formed on the same sheet, and the adjustment of density output characteristics and the adjustment of the image-forming position may be executed together. Furthermore, the tone patterns shown in FIG. 5A may also be used for adjustment of the image-forming position. In addition, each pattern for adjustment may be formed only on a single surface of the sheet, or may be formed on both surfaces of the sheet.

4. Provision of Preview Images

In the present embodiment, the UI control unit 222 provides an improved preview function to enable the user to more easily determine the influence of printing-related settings on a printing result. For example, the printer unit 120 is capable of forming the above-described patterns for adjustment intended for the automatic adjustment function in such a manner that they are superimposed over an image region in which a user image is formed on a sheet. That is to say, although the patterns for adjustment can be typically formed in a peripheral region of a sheet as has been described using FIG. 5A and FIG. 5B, this peripheral region can at least partially overlap a region in which a user image is formed. Therefore, there is a possibility that one or more patterns for adjustment in a peripheral region positionally compete with contents arranged by the user. For example, the user may arrange a code used for job management or content management (e.g., a serial number or a one-dimensional or two-dimensional barcode), a mark that acts as a benchmark for a task like trimming, a unique color patch, or the like in a peripheral region of an input image. In view of this, the UI control unit 222 is configured to also present a preview of each pattern for adjustment to the user on a preview screen that presents a preview of a user image. Especially, in the present embodiment, the UI control unit 222 controls the display of the operation panel 110 or the host computer 10 to display two or more preview images corresponding different printing-related settings without requiring the user to change the settings. For example, in a case where the printing-related settings are settings related to whether to print patterns different from a user image on a sheet, the two or more preview images may include a first preview image on which display objects representing these patterns are superimposed, and a second preview image on which display objects representing these patterns are not superimposed. The patterns mentioned here may be the above-described patterns for adjustment; in this case, the first preview image is a preview image generated by superimposing display objects representing the patterns for adjustment on the user image. The second preview image is a preview image of the user image on which display objects representing the patterns for adjustment are not superimposed. In the first preview image, the display position of each display object corresponds to the position on the sheet at which the corresponding pattern for adjustment is to be formed. For example, the preview screen may be called up from a print setting screen that is provided for settings of a print job to be executed (or any other setting screens).

Note that the printing-related settings are not limited to the above-described example. For example, the printing-related settings and two types of preview images corresponding thereto may include one or more of the following examples.

- First setting example: to print a certain pattern
  - First preview image: includes a user image and the pattern superimposed on the user image
  - Second preview image: includes only a user image (the pattern is not displayed)
- Second setting example: not to print a certain pattern
  - First preview image: same as first setting example
  - Second preview image: same as first setting example
- Third setting example: to print trim marks
  - First preview image: includes a user image and trim marks superimposed on the user image
  - Second preview image: includes only a user image (trim marks are not displayed)
- Fourth setting example: not to print trim marks
  - First preview image: same as third setting example
  - Second preview image: same as third setting example
- Fifth setting example: to print variable information (a serial number, a barcode, or the like)
  - First preview image: includes a user image and variable information superimposed on the user image
  - Second preview image: includes only a user image (variable information is not displayed)
- Sixth setting example: not to print variable information
  - First preview image: same as fifth setting example
  - Second preview image: same as fifth setting example Several embodiment examples related to display of a preview image on a preview screen will be described in detail in the present section.

4-1. Print Setting Screen

Figure 7:
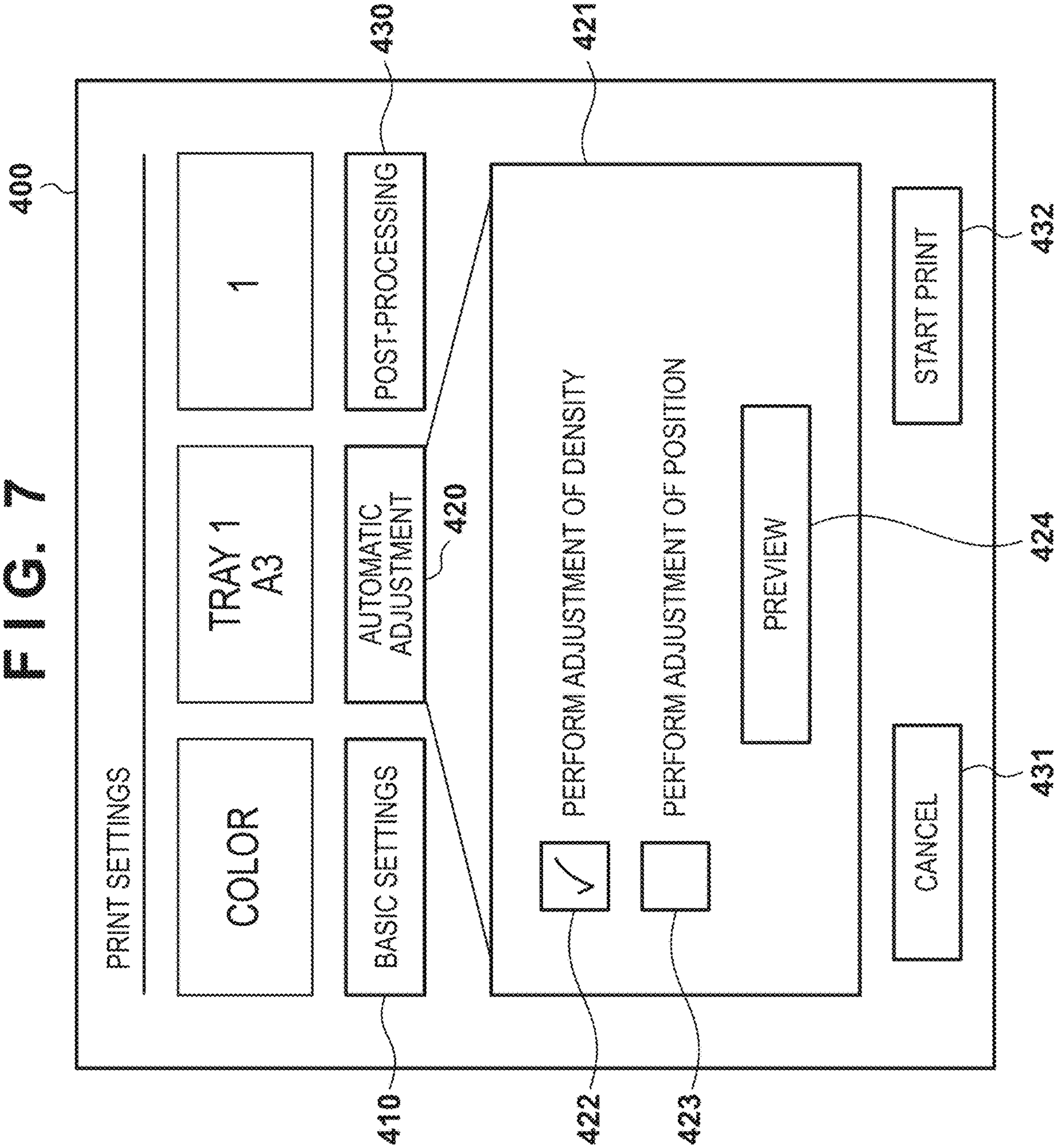
FIG. 7 is an explanatory diagram showing an example of a configuration of a print setting screen.

FIG. 7 is an explanatory diagram showing an example of a configuration of a print setting screen 400 that can be provided by the UI control unit 222. Referring to FIG. 7, the print setting screen 400 includes a basic setting button 410, an automatic adjustment button 420, an automatic adjustment setting area 421, a post-processing button 430, a cancel button 431, and a print start button 432.

The basic setting button 410 is a button for calling up basic setting items of a print job. The automatic adjustment button 420 is a button for calling up setting items related to the above-described automatic adjustment function of the image-forming apparatus 100. The post-processing button 430 is a button for calling up setting items related to a post-processing function of the image-forming apparatus 100. The cancel button 431 is a button for cancelling the issuance of a print job and closing the print setting screen 400. The print start button 432 is a button for issuing a print job and causing the printer unit 120 to start image formation. In the example of FIG. 7, the automatic adjustment setting area 421 is displayed on the print setting screen 400 as a result of the user operating the automatic adjustment button 420. The automatic adjustment setting area 421 includes a density adjustment checkbox 422, a position adjustment checkbox 423, and a preview button 424.

The density adjustment checkbox 422 is an object for enabling or disabling automatic adjustment of density. The position adjustment checkbox 423 is an object for enabling or disabling automatic adjustment of an image-forming position. In the example of FIG. 7, as the density adjustment checkbox 422 is ON and the position adjustment checkbox 423 is OFF, only automatic adjustment of density is enabled. The preview button 424 can be operated when at least one of the checkboxes 422 and 423 is ON. For example, if the user operates the preview button 424 in a state where only the density adjustment checkbox 422 is ON, a preview screen that provides a preview image including tone patterns for density adjustment is displayed on a display.

4-2. Preview Screen—First Embodiment Example

Figure 8:
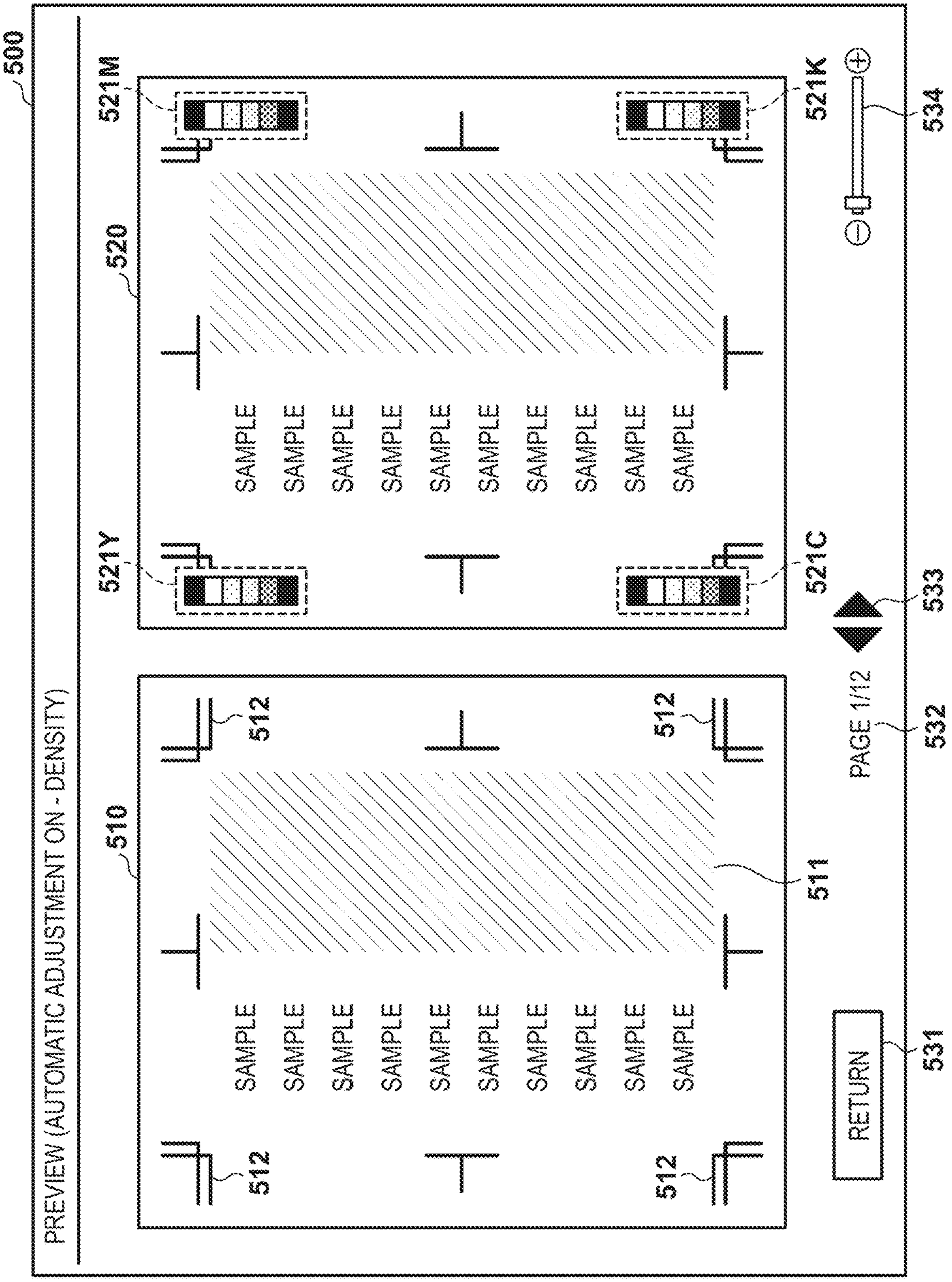
FIG. 8 is an explanatory diagram showing an example of a configuration of a preview screen according to a first embodiment example.

In the first embodiment example, the UI control unit 222 controls the display unit to display the first preview image including display objects representing the patterns for adjustment, and the second preview image representing only a user image in parallel on a preview screen. FIG. 8 is an explanatory diagram showing an example of a configuration of a preview screen 500 according to the first embodiment example. Referring to FIG. 8, the preview screen 500 includes an input preview area 510, a printing preview area 520, a return button 531, a page number field 532, page transition buttons 533, and a slider 534.

The input preview area 510 is an area in which the second preview image only with the user image is displayed. The user image includes one or more auxiliary contents 512 in addition to a main content 511 at the center. In the example of FIG. 8, the auxiliary contents 512 are trim marks (also referred to as crop marks).

The printing preview area 520 is an area in which the first preview image with display objects representing the patterns for adjustment superimposed on the user image is displayed. In the example of FIG. 8, display objects 521Y, 521M, 521C, and 521K representing the tone patterns 320Y, 320M, 320C, and 320K are superimposed on the user image that is the same as that displayed in the input preview area 510.

The return button 531 is a button for closing the preview screen 500 and returning to the print setting screen 400. The page number field 532 is a field that displays the total number of pages and the page number of a page that is currently displayed in a case where contents to be printed extend over a plurality of pages. The page transition buttons 533 are buttons for making a transition from the page displayed in both preview areas 510 and 520 to a preceding page or a succeeding page. The slider 534 is an object that allows the scales of the preview images displayed in both preview areas 510 and 520 on the screen to be changed.

In the example of FIG. 8, the four auxiliary contents 512 that the user has arranged at four corners of the user image are partially hidden by the display objects 521Y, 521M, 521C, and 521K, respectively. There is a possibility that the user does not notice such a partially hidden state simply by looking at the image of the printing preview area 520. However, in the present embodiment example, the user can compare the displays in the input preview area 510 and the printing preview area 520, and thus can easily notice that the four auxiliary contents 512 are partially hidden. The user who has seen the preview screen 500 may disable the automatic adjustment function in the immediate print job, may rearrange the auxiliary contents 512 at positions where they do not overlap any tone pattern, or may change the settings of positions of the tone patterns if possible.

As described above, each tone pattern is typically composed of one or more patch regions and a mask region that surrounds these patch regions. The mask regions are blank regions; therefore, if the mask regions are presented as is, there is a possibility that the user who has seen the preview images cannot recognize the existence of the mask regions. In view of this, the UI control unit 222 may additionally display a frame indicating the periphery of each mask region in the printing preview area 520. In the example of FIG. 8, dash-line frames surrounding the display objects 521Y, 511M, 511C, and 511K are aligned with the peripheries of the mask regions of the respective tone patterns.

Note that in a case where automatic adjustment of the image-forming position is enabled, display objects representing the position determination marks, which have been described using FIG. 5B, can be displayed in the printing preview area 520. Any display object is not limited to the illustrated examples; for example, each display object may be, for example, a simple box or icon indicating the range occupied by the corresponding pattern for adjustment. Regarding the position determination marks, too, frames indicating the peripheries of mask regions around the marks may be added to the display objects on the screen.

Figure 9:
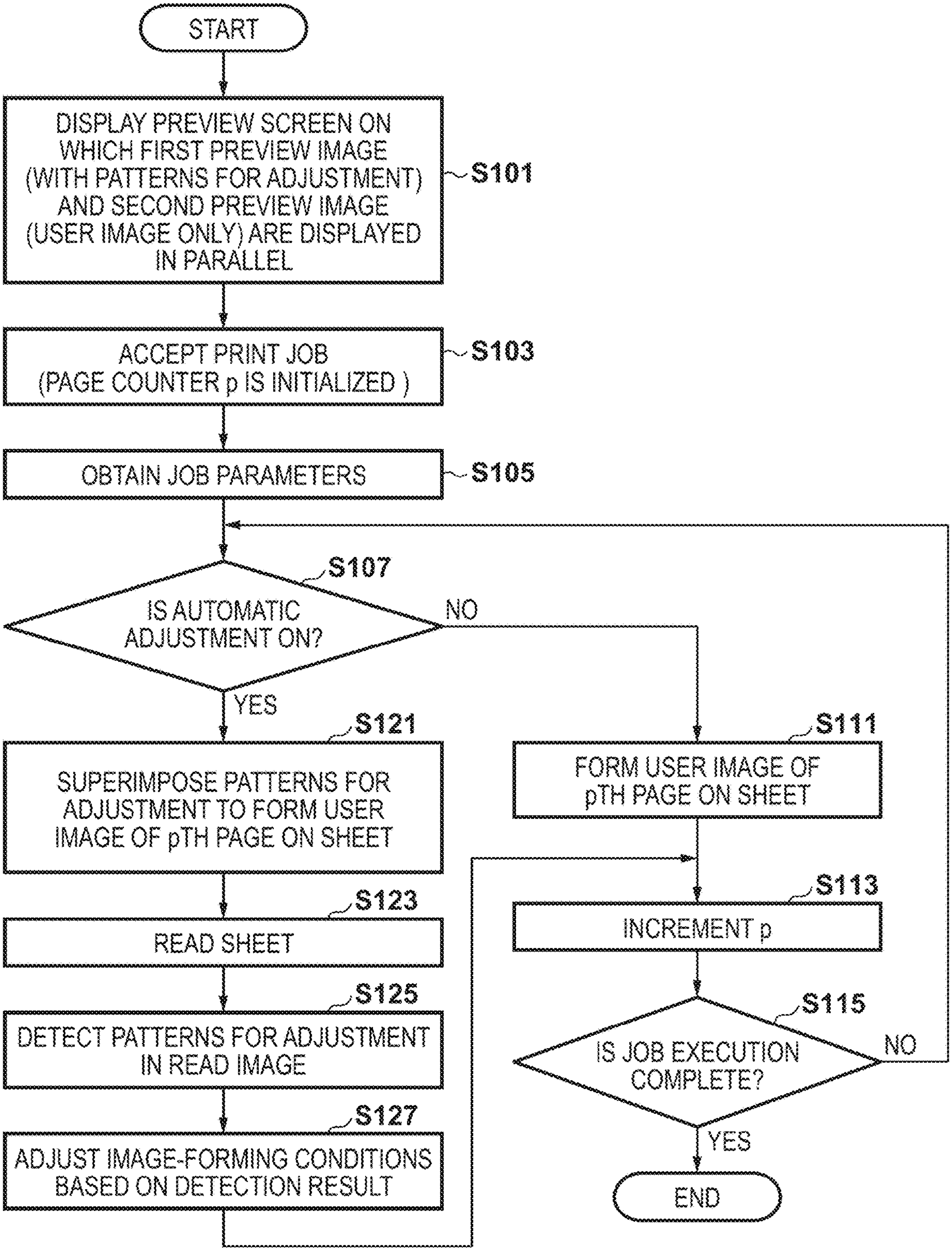
FIG. 9 is a flowchart showing an example of a flow of job execution processing according to the first embodiment example.

FIG. 9 is a flowchart showing an example of a flow of job execution processing that can be executed by the image-forming apparatus 100 in the present embodiment example. Note that in the following description, processing steps will be abbreviated as "S".

First, in step S101, the UI control unit 222 of the controller 200 in the image-forming apparatus 100 displays preview screens related to a print job on the display of the host computer 10 or the operation panel 110 in response to a call from the user. Here, it is assumed that the function of automatic adjustment of image-forming conditions is enabled, and the UI control unit 222 controls the display such that the first preview image and the second preview image are displayed in parallel on a preview screen. The first preview image is an image in which display objects representing the patterns for adjustment are superimposed on a user image, and the second preview image is an image on which the display objects representing the patterns for adjustment are not superimposed.

Next, in step S103, once the user has issued an instruction for starting the execution of the print job, the UI control unit 222 accepts the print job. For example, the print job is received from the host computer 10 via the network 20 or the communication interface 211, or generated in response to a command input from the operation panel 110. The print job includes input image data representing a user image to be printed. At this time, a page counter p, which is a variable for identifying a page to be printed, is initialized to zero.

Next, in step S105, the UI control unit 222 obtains job parameters of the accepted print job. The job parameters include not only parameters for basic settings, such as the number of copies to be printed, a designated sheet type, and double-sided/single-sided, but also a parameter indicating whether the automatic adjustment function is enabled for at least one image-forming condition. Thereafter, processing bifurcates in step S107 depending on whether the automatic adjustment function is enabled. In a case where the automatic adjustment function is enabled (automatic adjustment is ON), processing proceeds to step S121. In a case where the automatic adjustment function is not enabled (automatic adjustment is OFF), processing proceeds to step S111.

In a case where the automatic adjustment function is not enabled, in step S111, the printer unit 120 forms a user image of the $p^{th}$ page on a sheet under control of the controller 200. Next, in step S113, the page counter p is incremented (one is added thereto). Next, in step S115, whether the execution of the print job has been completed is determined. For example, in a case where the page counter p has not reached the total number of sheets to be printed, it is determined that the execution of the print job has not been completed, and processing returns to step S107. On the other hand, in a case where the page counter p has reached the total number of sheets to be printed, it is determined that the execution of the print job has been completed, and the flowchart of FIG. 9 is ended.

In a case where the automatic adjustment function is enabled, in step S121, the printer unit 120 forms a user image of the $p^{th}$ page on a sheet under control of the controller 200. At this time, the adjustment unit 221 superimposes one or more patterns for adjustment used in the automatic adjustment on the user image.

Next, in step S123, the line sensor 156 of the reader unit 150 generates a read image by optically reading the sheet on which the user image and the patterns for adjustment have been formed. Next, in step S125, the detection circuit 170 of the reader unit 150 searches the read image generated in step S123 for each of the one or more patterns for adjustment used in the automatic adjustment, and detects each pattern for adjustment.

Next, in step S127, the adjustment unit 221 of the controller 200 adjusts the image-forming conditions of the printer unit 120 based on the detection result input from the detection circuit 170. For example, in a case where automatic adjustment of density is enabled, the detection result input from the detection circuit 170 can indicate the average pixel values for the respective color components and the respective tones, which have been calculated based on the patch images in the tone patterns detected inside the read image. For example, the adjustment unit 221 converts the average pixel values into density values using known conversion coefficients for the respective color components, and adjusts the density output characteristic of each of the image-forming units 140Y, 140M, 140C, and 140K so as to compensate for the density difference from desired density. Here, the conversion coefficients can be decided on in advance based on the characteristics of RGB color filters of the line sensor 156 and the CMYK density characteristics of the printer unit 120, and stored into the ROM 212. Note that the adjustment of the density output characteristics based on reading of the tone patterns or patch images may be performed in accordance with any known method. As one example, the adjustment unit 221 may update a lookup table that is referred to when converting pixel values of each color component of input image data into output density values so as to compensate for the density differences based on the result of detection of the tone patterns.

Next, processing proceeds to step S113, and the page counter p is incremented (one is added thereto) as stated earlier. Next, in step S115, whether the execution of the print job has been completed is determined; in a case where it has been determined that the execution has not been completed, processing returns to step S107. On the other hand, in a case where it has been determined that the execution of the print job has been completed, the flowchart of FIG. 9 is ended.

Note that although FIG. 9 shows the flow of processing in which the patterns for adjustment are superimposed on every page of the user image, the patterns for adjustment may be superimposed only on the first page (or any page designated by the user). The adjustment of the image-forming conditions may be applied to succeeding pages in the same print job, or may be applied to a succeeding print job.

According to the foregoing first embodiment example, prior to the execution of a print job, the user can easily check whether content arranged on a user image overlaps the patterns for adjustment for automatic adjustment of image-forming conditions by comparing two preview images that are displayed in parallel. That is to say, the user can easily determine, on a screen, the influence of a setting that is selected at the present moment on a printing result without having to change printing-related settings.

4-3. Preview Screen—Second Embodiment Example

Figure 10A:
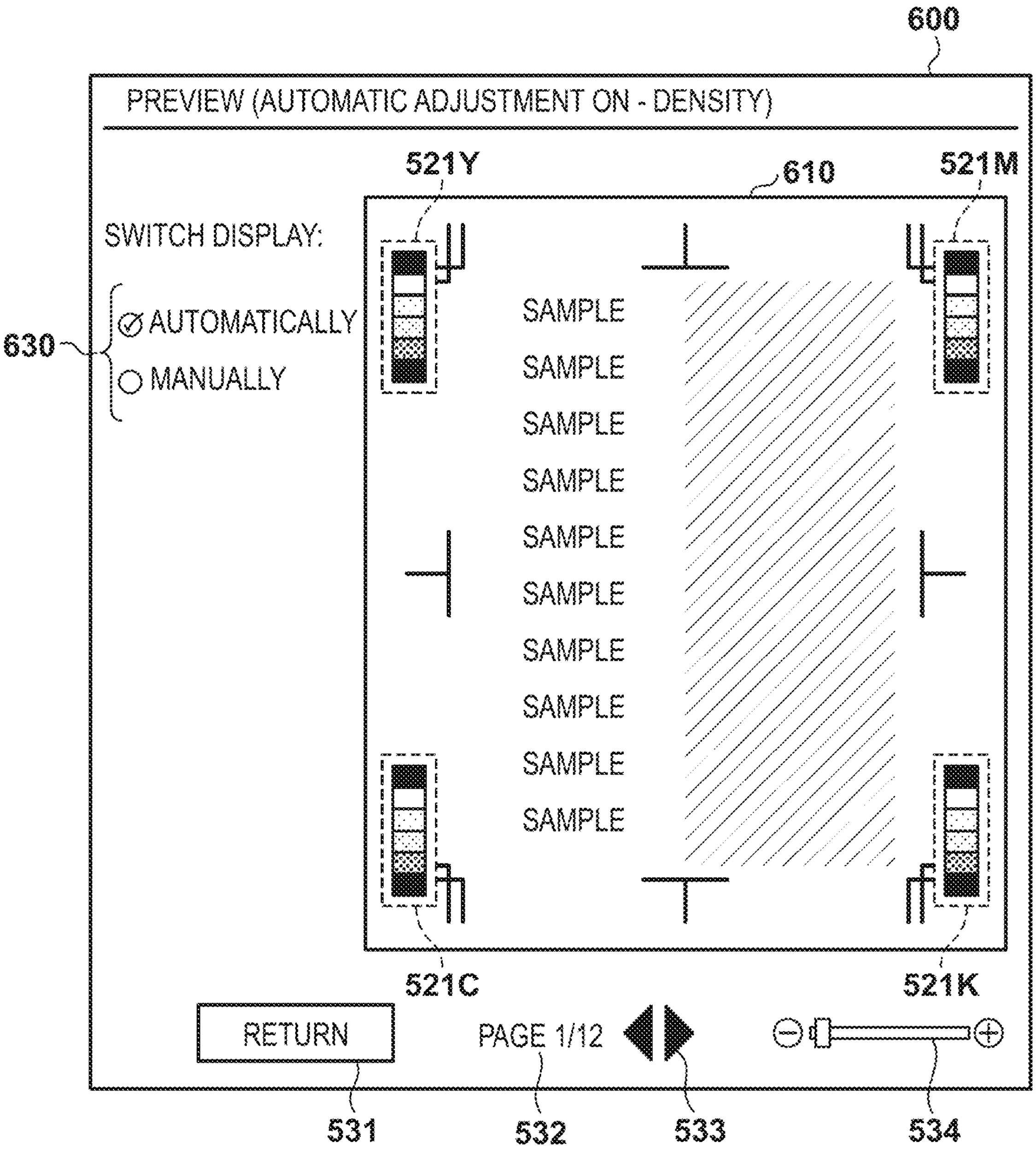
FIG. 10A is a first explanatory diagram showing an example of a configuration of a preview screen according to a second embodiment example.
Figure 10B:
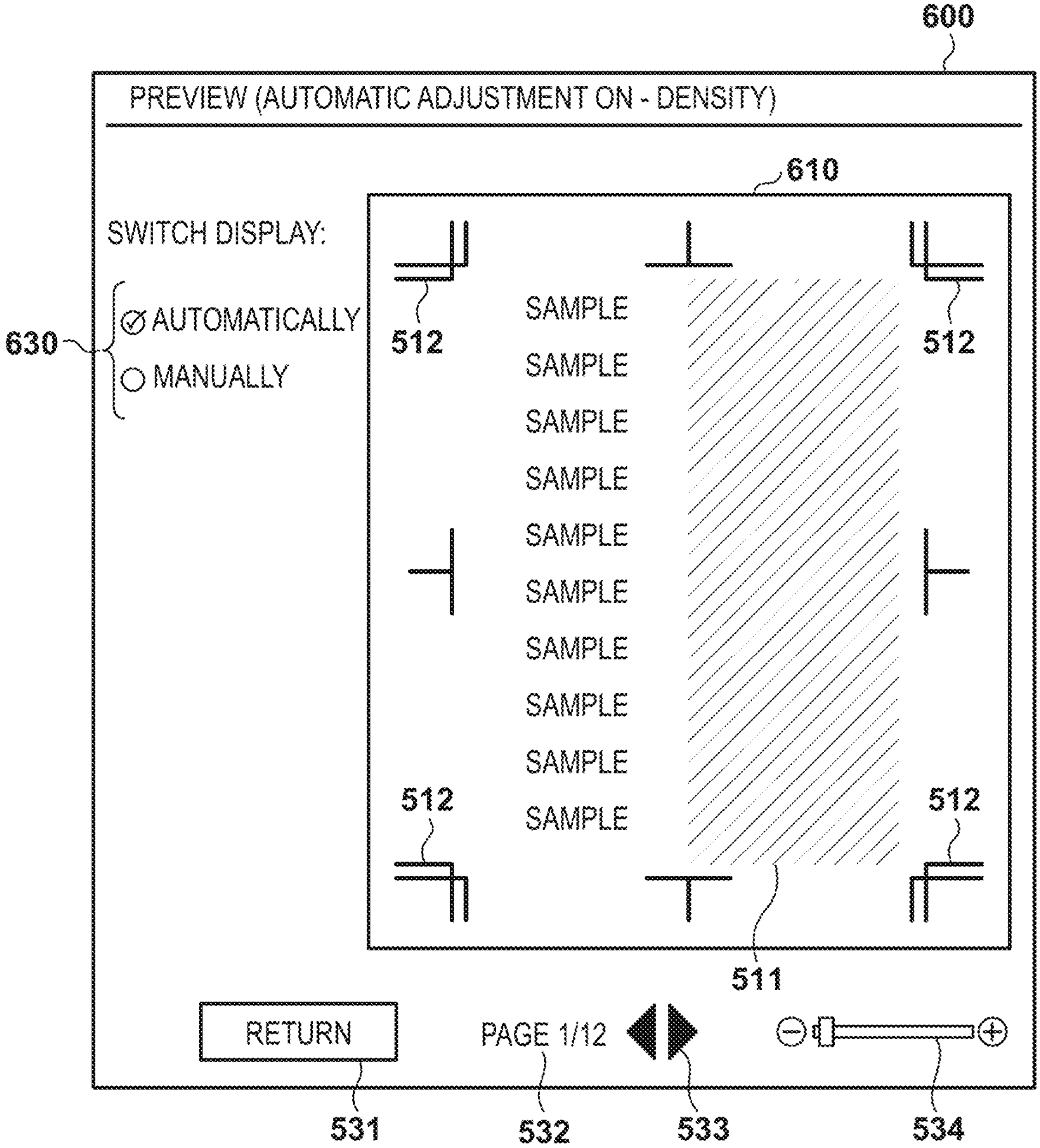
FIG. 10B is a second explanatory diagram showing an example of a configuration of a preview screen according to the second embodiment example.

In the second embodiment example, the UI control unit 222 controls the display unit to display the first preview image including display objects representing the patterns for adjustment and the second preview image representing only a user image on a preview screen in a temporally alternating manner. FIG. 10A and FIG. 10B are explanatory diagrams showing an example of a configuration of a preview screen 600 according to the second embodiment example.

Referring to FIG. 10A, the preview screen 600 includes a preview area 610, radio buttons 630, a return button 531, a page number field 532, page transition buttons 533, and a slider 534. The preview area 610 is an area that selectively displays the first preview image or the second preview image. In the example of FIG. 10A, display objects 521Y, 521M, 521C, and 521K representing the tone patterns 320Y, 320M, 320C, and 320K are superimposed on a user image in the preview area 610.

The radio buttons 630 are buttons for allowing the user to select whether to switch the preview image displayed in the preview area 610 automatically or in response to a user input (i.e., manually). In the example of FIG. 10A, automatic switching has been selected. Therefore, the UI control unit 222 automatically switches between display of the first preview image and display of the second preview image on the preview screen 600 in a constant cycle. When switching the display of the preview area 610 from the first preview image to the second preview image or vice versa, the UI control unit 222 may apply such effects as fade-in and fade-out.

Note that in a case where manual switching has been selected via the radio buttons 630, the UI control unit 222 may switch between display of the first preview image and display of the second preview image in response to a pre-defined user input (e.g., a touch or a click on the preview area 610). Also, the radio buttons 630 may be omitted from the configuration of the preview screen 600. In this case, switching between display of the first preview image and display of the second preview image can be either constantly performed automatically, or necessarily performed manually.

FIG. 10B shows the preview screen 600 similar to that of FIG. 10A; note that the display of the preview area 610 has been switched to the second preview image that represents only a user image and does not include the display objects 521Y, 521M, 521C, and 521K. In this case, too, the user image includes one or more auxiliary contents 512 in addition to a main content 511 at the center.

In the present embodiment example, the user can easily notice that the auxiliary contents are partially hidden by the patterns for adjustment by comparing the first and second preview images, which are displayed in a temporally alternating manner, within the preview area 610 located at a fixed position. That is to say, the user can easily determine, on the screen, the influence of a setting that is selected at the present moment on a printing result without having to change printing-related settings. The user who has seen the preview screen 600 may disable the automatic adjustment function in the immediate print job, may rearrange the auxiliary contents 512, or may change the settings of positions of the tone patterns if possible. In the present embodiment example, too, the UI control unit 222 may additionally display a frame indicating the periphery of the mask region of each pattern for adjustment in the preview area 610.

In the present embodiment example, the flow of the job execution processing that can be executed by the image-forming apparatus 100 may be similar to the flow that has been described using FIG. 9 in the first embodiment example. However, in the present embodiment example, the UI control unit 222 causes the display unit of the host computer 10 or the operation panel 110 to display the preview screen 600 in response to a call from the user in step S101. Then, on the preview screen 600, the UI control unit 222 switches the display of the preview area 610 between the first preview image and the second preview image in a temporally alternating manner.

4-4. Modified Example

The above two embodiment examples have been described using an example in which display objects representing patterns for adjustment are superimposed on a user image on a first preview image displayed on a preview screen. However, this leaves the possibility that the display of the entire first preview image does not necessarily facilitate checking of details of each individual pattern for adjustment, and the user overlooks an overlap between content within the user image and the patterns for adjustment. In view of this, in one modified example, the UI control unit 222 may provide an enlarged display of a display object and a vicinity thereof that correspond to each individual pattern for adjustment on the preview screen in a case where a predetermined user input has been detected.

Figure 11:
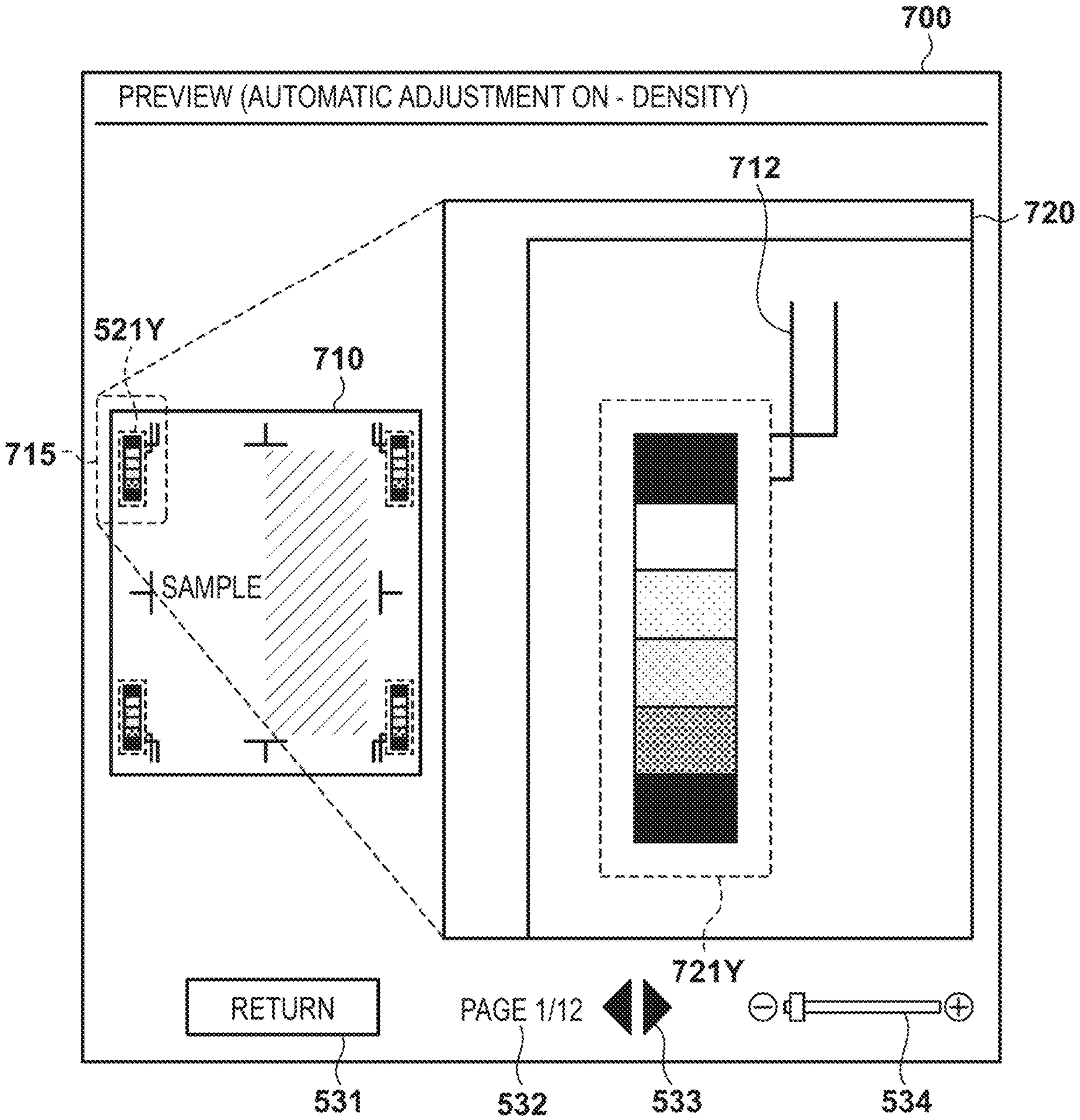
FIG. 11 is an explanatory diagram showing an example of a configuration of a preview screen according to a modified example.

FIG. 11 is an explanatory diagram showing an example of a configuration of a preview screen 700 according to the present modified example. Referring to FIG. 11, the preview screen 700 includes an overall display area 710, an enlarged display area 720, a return button 531, a page number field 532, page transition buttons 533, and a slider 534. The overall display area 710 is an area in which the entirety of the first preview image with display objects representing the patterns for adjustment are superimposed is displayed. The enlarged display area 720 is an area in which an enlarged image that indicates a part of the first preview image in an enlarged manner is displayed. The enlarged image displayed in the enlarged display area 720 may be an image that shows a range in which one pattern for adjustment is hidden by the user image in an enlarged manner.

In the example of FIG. 11, among the display objects of the four patterns for adjustment shown in the overall display area 710, the upper-left display object 521Y is selected to be displayed in an enlarged manner, and a frame 715 indicating the range to be displayed in an enlarged manner is indicated by a dash line. In order to indicate with emphasis that the display object 521Y has been selected, the UI control unit 222 may cause a display attribute (density, color, thickness, or the like) of the frame 715 to be different from a display attribute of a frame indicating the periphery of each display object. The enlarged display area 720 displays a part of the first preview image inside the range indicated by the frame 715. A display object 721Y inside the enlarged display area 720 is the enlarged version of the display object 521Y representing the tone pattern 320Y. A dash-line frame added to the display object 721Y indicates the periphery of the mask region of the tone pattern 320Y. The user can clearly perceive that the display object 721Y is hiding an auxiliary content 712 in this enlarged display, and easily notice that the tone pattern 320Y has a high possibility of hiding the trim mark if printing is continued as is.

In a case where a plurality of patterns for adjustment exist, the user may be able to select a pattern for adjustment to be displayed in an enlarged manner on the screen. The magnification of the enlarged display may be changeable via an operation on the slider 534. Such an enlarged display may be provided in a case where, for example, some sort of user input has been detected on the preview screen 500 according to the first embodiment example or the preview screen 600 according to the second embodiment example.

4-5. Preview Screen—Third Embodiment Example

Among various displays of preview images according to the above-described embodiment examples and modified example, two or more may be provided as candidates for a display mode that can be selected by the user. For example, the UI control unit 222 may display the preview images in a parallel display mode described in the first embodiment example in a case where a first user input has been detected, and display the preview images in an alternating display mode described in the second embodiment example in a case where a second user input has been detected. In the parallel display mode, the UI control unit 222 controls the display such that the first preview image and the second preview image are displayed in parallel on a preview screen. In the alternating display mode, the UI control unit 222 controls the display such that the first preview image and the second preview image are displayed on the preview screen in a temporally alternating manner.

Furthermore, one or more of the following display modes may be selectable via a user interface as candidates for a display mode.

Printing preview mode

Input preview mode

Enlarged display mode

The printing preview mode is a mode in which only the first preview image is displayed. The input preview mode is a mode in which only the second preview image is displayed. The enlarged display mode is a mode in which a pattern for adjustment is displayed in an enlarged manner as has been described in the previous section.

Figure 12:
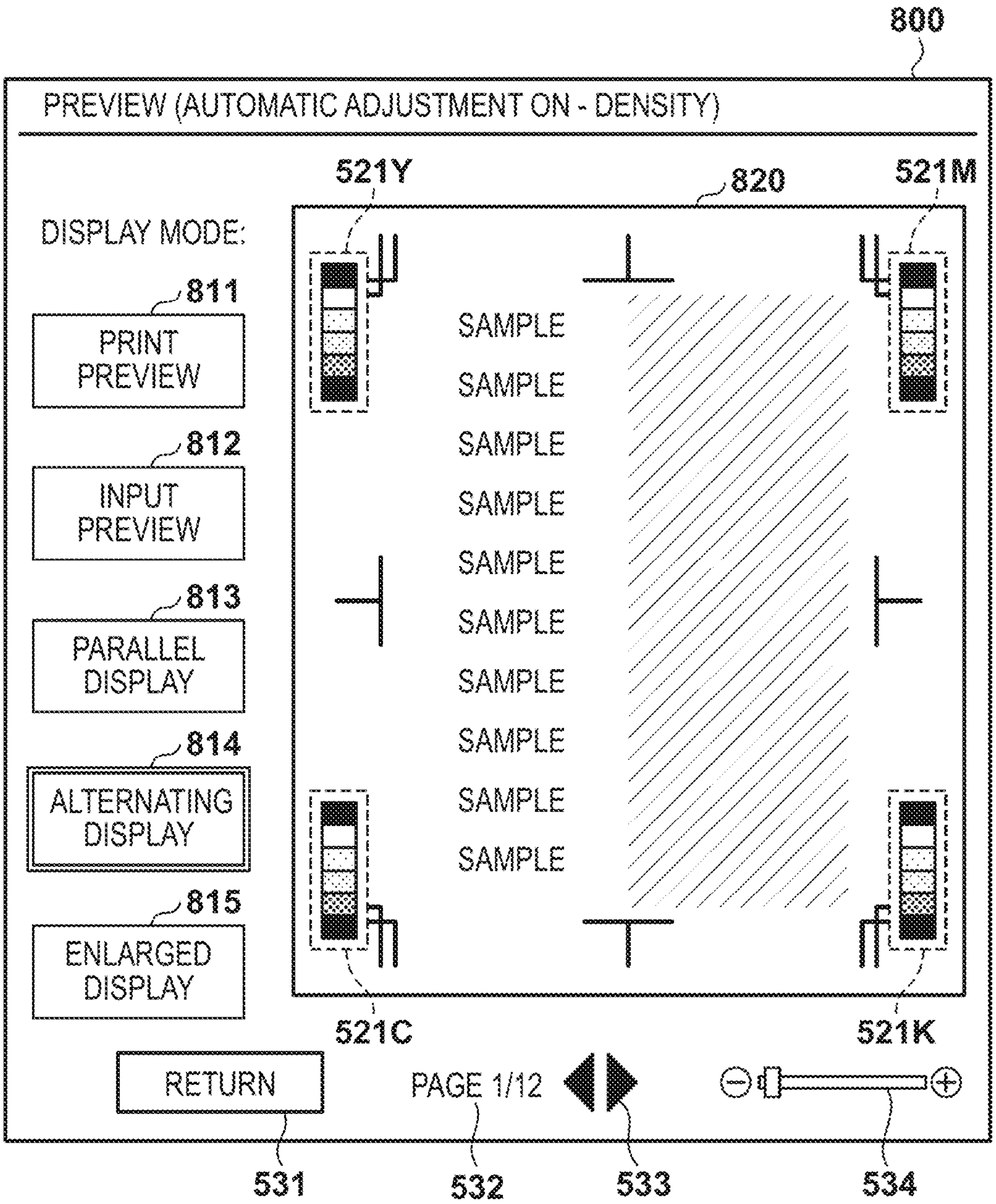
FIG. 12 is a second explanatory diagram showing an example of a configuration of a preview screen according to a third embodiment example.

FIG. 12 is an explanatory diagram showing an example of a configuration of a preview screen 800 according to the third embodiment example. Referring to FIG. 12, the preview screen 800 includes mode selection buttons 811, 812, 813, 814, and 815, a preview area 820, a return button 531, a page number field 532, page transition buttons 533, and a slider 534.

The mode selection button 811 is a button for selecting the printing preview mode. The mode selection button 812 is a button for selecting the input preview mode. The mode selection button 813 is a button for selecting the parallel display mode. The mode selection button 814 is a button for selecting the alternating display mode. The mode selection button 815 is a button for selecting the enlarged display mode. The preview area 820 is an area for displaying a preview image(s) in the display mode selected via the mode selection buttons 811 to 815. In the example of FIG. 12, the mode selection button 814 is displayed with emphasis to indicate that the alternating display mode has been selected in response to an operation on the mode selection button 814. Although the preview area 820 in the figure displays the first preview image in which the display objects 521Y to 521K representing the patterns for adjustment are superimposed on a user image, this display can be switched to and from the second preview image in a constant cycle in the alternating display mode.

In the present embodiment example, the flow of the job execution processing that can be executed by the image-forming apparatus 100 may be similar to the flow that has been described using FIG. 9 in the first embodiment example. However, in the present embodiment example, the UI control unit 222 causes the display unit of the host computer 10 or the operation panel 110 to display the preview screen 800 in response to a call from the user in step S101. Then, the UI control unit 222 controls the display unit such that the preview screen 800 displays the preview image(s) in the display mode selected via the mode selection buttons 811 to 815.

In the present embodiment example, prior to the execution of a print job, the user can check whether content arranged on a user image overlaps a pattern for adjustment while freely selecting one of a plurality of display modes that can include the parallel display mode and the alternating display mode. This makes it even easier for the user to notice an overlap between content of a user image and a pattern for adjustment.

5. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-214035, filed on Dec. 19, 2023 which is hereby incorporated by reference herein in its entirety.

What is claimed is:

1. An image-forming apparatus, comprising:

an image-forming unit configured to form a user image on a sheet based on printing-related settings; and a control unit configured to cause a display unit to display a preview image related to the user image formed by the image-forming unit, wherein the control unit is configured to control the display unit to display two or more preview images corresponding to different printing-related settings without requiring a user to change settings, the printing-related settings include a setting related to whether to print a pattern different from the user image on the sheet, and the two or more preview images include a first preview image on which a display object representing the pattern is superimposed, and a second preview image on which the display object representing the pattern is not superimposed.

2. The image-forming apparatus according to claim 1, wherein the control unit is configured to control the display unit to display the first preview image and the second preview image in parallel on a preview screen.

3. The image-forming apparatus according to claim 1, wherein the control unit is configured to control the display unit to display the first preview image and the second preview image on a preview screen in a temporally alternating manner.

4. The image-forming apparatus according to claim 3, wherein the first preview image and the second preview image displayed on the preview screen are automatically switched in a constant cycle.

5. The image-forming apparatus according to claim 1, wherein the control unit is configured to in a case where a first user input has been detected, control the display unit to display the first preview image and the second preview image in parallel on a preview screen, and in a case where a second user input has been detected, control the display unit to display the first preview image and the second preview image on the preview screen in a temporally alternating manner.

6. The image-forming apparatus according to claim 1, wherein the control unit is configured to, in a case where a predetermined user input has been detected, control the display unit to display an enlarged image that shows a range in which the pattern hides the user image in an enlarged manner.

7. The image-forming apparatus according to claim 1, wherein the pattern includes a pattern for adjustment which can be formed by the image-forming unit on the sheet in accordance with the printing-related settings and which is used for adjustment of at least one image-forming condition, the image-forming apparatus further comprises:

a reading unit configured to generate a read image by optically reading the sheet; and an adjustment unit configured to adjust the at least one image-forming condition based on a result of detection of the pattern for adjustment in the read image generated by the reading unit, and the control unit is configured to, in a case where the image-forming unit is set to form the pattern for adjustment on the sheet, control the display unit to display the first preview image on which a display object representing the pattern for adjustment is superimposed, and the second preview image on which the display object representing the pattern for adjustment is not superimposed.

8. The image-forming apparatus according to claim 7, wherein the pattern for adjustment includes a non-blank region and a blank region that surrounds the non-blank region, and the display object includes a frame indicating a periphery of the blank region.

9. The image-forming apparatus according to claim 7, wherein the at least one image-forming condition includes a condition related to density of an image formed by the image-forming unit, and the pattern for adjustment includes a pattern used in density adjustment.

10. The image-forming apparatus according to claim 7, wherein the at least one image-forming condition includes a condition related to an image-forming position at which the image-forming unit forms the user image, and the pattern for adjustment includes a pattern used in measurement of a displacement of the image-forming position.

11. The image-forming apparatus according to claim 1, comprising the display unit.

12. The image-forming apparatus according to claim 1, further comprising a communication unit configured to perform communication with another apparatus including the display unit.

13. A method executed by an image-forming apparatus, the method comprising:

forming a user image on a sheet based on printing-related settings; and causing a display apparatus to display a preview image related to the user image before the user image is formed on the sheet, wherein the causing the display apparatus to display the preview image includes controlling the display apparatus to display two or more preview images corresponding to different printing-related settings without requiring a user to change settings, the printing-related settings include a setting related to whether to print a pattern different from the user image on the sheet, and the two or more preview images include a first preview image on which a display object representing the pattern is superimposed, and a second preview image on which the display object representing the pattern is not superimposed.

* * * * *